United States Patent [19]

Raftis

[11] Patent Number: 4,534,224
[45] Date of Patent: Aug. 13, 1985

[54] ISOLATION FLUID PRESSURE DETECTOR

[75] Inventor: Spiros G. Raftis, Pittsburgh, Pa.

[73] Assignee: Red Valve Company, Inc., Carnegie, Pa.

[21] Appl. No.: 611,333

[22] Filed: May 17, 1984

[51] Int. Cl.³ .............................................. G01L 7/08
[52] U.S. Cl. .................................. 73/730; 73/119 A; 73/756
[58] Field of Search ..................... 73/730, 119 A, 756; 277/167.5

[56] References Cited

U.S. PATENT DOCUMENTS

| | | | |
|---|---|---|---|
| 2,552,750 | 5/1951 | Thornhill | 277/167.5 |
| 3,163,529 | 12/1964 | Jewett | 73/730 |
| 3,563,095 | 2/1971 | Robinson, Jr. | 73/730 |
| 4,218,926 | 8/1980 | De Visser | 73/730 |

Primary Examiner—Donald O. Woodiel
Attorney, Agent, or Firm—Kirschstein, Kirschstein, Ottinger & Israel

[57] ABSTRACT

An isolation fluid pressure detector includes a housing which bounds an internal bore and a recess situated at the axially central region of the bore and extending radially outwardly of the bore over the entire circumference of the same. A flexible sleeve-shaped element is received in the bore and includes a flexible intermediate portion which spans the recess, and two end portions which extend to a considerable distance from the flexible portion along the surface bounding the bore. The sleeve-shaped element has external arms which axially bound a confining space in the recess and are confined between end portions and an intermediate portion of the housing to seal such interfaces. A pressure gauge detects the pressure prevailing in the confining space through a measuring port of the housing. When fluid to be measured is admitted into an internal passage of the sleeve-shaped element, its pressure deflects the flexible portion, thus changing the pressure of a pressure-transmitting fluid confined in the confining space, the pressure-transmitting fluid in turn exerting its pressure on a pressure-detecting mechanism of the gauge, which thus gives accurate indication of the pressure of the fluid in the passage. The integral end portions of the sleeve-shaped element prevent the fluid being measured from penetrating into the interfaces between thearms and the surfaces axially delimiting the recess, thus avoiding interference with the flexing of the flexible portion.

7 Claims, 3 Drawing Figures

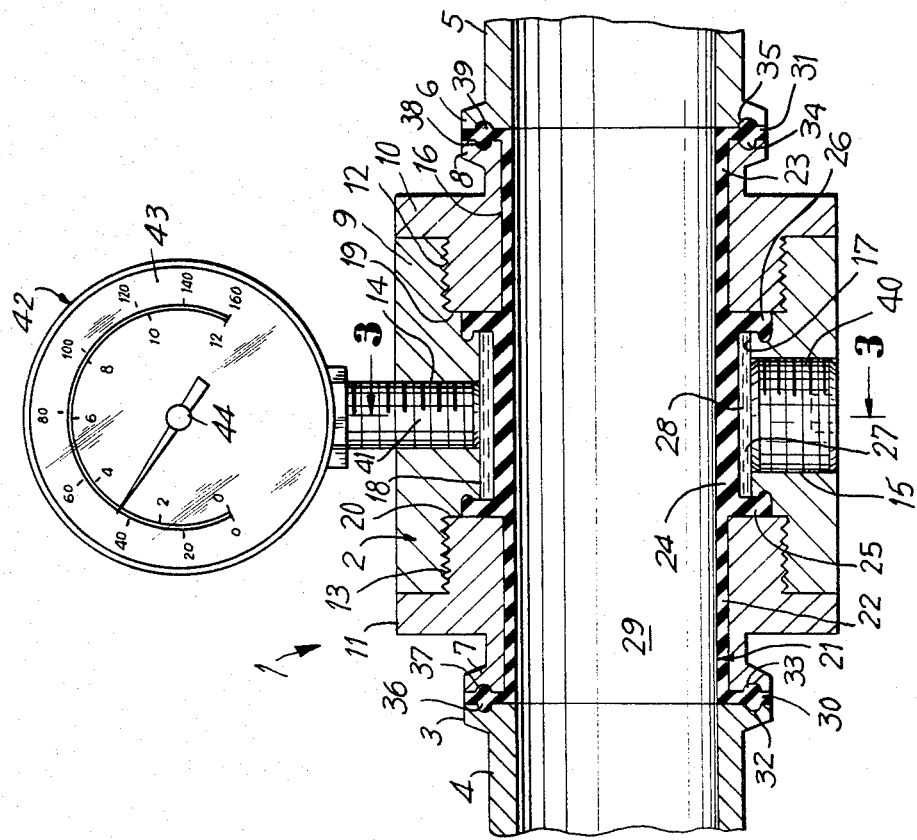
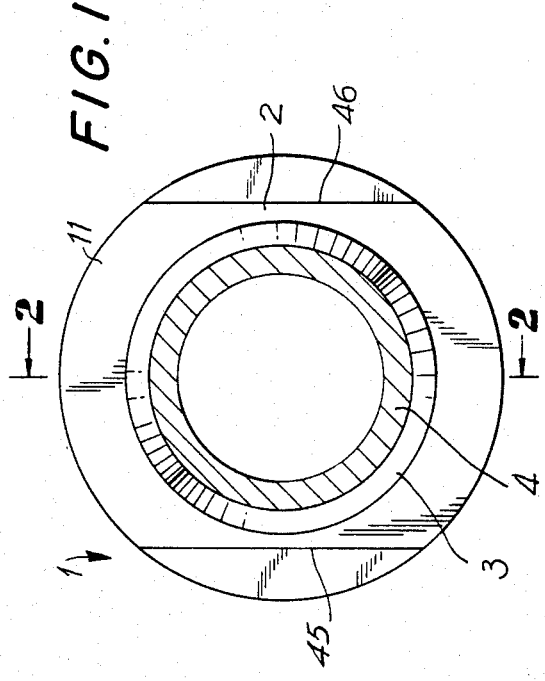
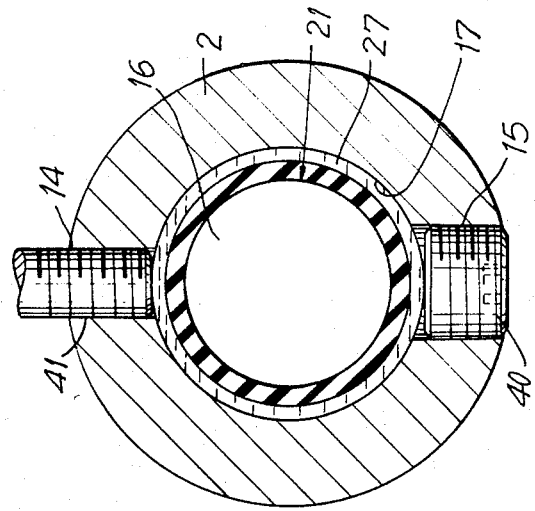

ISOLATION FLUID PRESSURE DETECTOR

BACKGROUND OF THE INVENTION

The present invention relates generally to fluid pressure detecting or measuring arrangements, and more particularly to arrangements of this type in which the fluid whose pressure is being measured is isolated from the pressure-detecting mechanism or gauge.

There are already known various constructions of fluid-pressure detecting or measuring arrangements, among them such in which a flexible member or diaphragm isolates or separates the fluid whose pressure is to be detected from the pressure-detecting mechanism or gauge proper, and wherein a pressure-transmitting fluid is used to transmit the pressure which acts on the flexible member to the gauge. In one such arrangement which is commercially available, a generally annular housing is interposed between two flanges of a pipeline and connected thereto, the inner diameter of the housing exceeding that of the pipeline. Then, an annular flexible element having an inner diameter substantially corresponding to that of the pipeline is received in the housing. This element includes a tubular section and two collars or outwardly extending arms which extend along the flanges of the pipeline and bound a confining space between themselves, the tubular portion, and the internal surface of the housing. This confining space is filled with the pressure-transmitting liquid, as is a gauge which is in communication with the confining space through a portion thereof which is sealingly received in a port of the housing that opens on the internal surface of the latter.

This known arrangement works quite satisfactorily in many instances, in that the pressure of the fluid that is to be detected acts on the flexible tubular portion of the flexible element and flexes the same accordingly, thereby displacing the corresponding amount of the pressure-transmitting fluid out of the confining space and into the gauge, which is thus subjected to a pressure corresponding to that to be detected and thus indicates the same with an accuracy which is determined solely by the construction of the gauge and is inherent therein. Moreover, since the inner diameter of the flexible tubular portion of the flexible element corresponds to that of the pipeline, there is a smooth transition between the pipeline and the flexible element, thus avoiding corners in the flow path, where ingredients of the fluid whose pressure is being detected could deposit, with deleterious effects on the performance of the arrangement. Also, the flexible element separates the fluid whose pressure is to be detected from the gauge, thus protecting the latter, for instance, from attack or clogging by such fluid. Furthermore, since the flexible tubular portion flexes during the use of the arrangement, any deposits or encrustations which may develop thereon are broken up and dissociated from the flexible portion, thus not interfering with the flexing of the latter.

However, experience with the arrangement described above has shown that, as advantageous as it may be in many respects, it still can happen that the fluid being measured penetrates into the interfaces between the flexible element or the arms thereof and the flanges of the pipeline, where it can form encrustations or deposits or otherwise interfere with the proper operation of the pressure-detecting arrangement.

SUMMARY OF THE INVENTION

Accordingly, it is a general object of the present invention to avoid the disadvantages of the prior art.

More particularly, it is an object of the present invention to provide an isolation pressure-detecting arrangement which does not possess the disadvantages of the conventional arrangements of this kind.

Still another object of the present invention is so to construct the arrangement of the type here under consideration as to avoid the possibility that the fluid being measured could penetrate into any gaps between the flexible element and the housing accommodating the same at the region at which the detection is being performed.

It is yet another object of the present invention so to design the arrangement of the above type as to prevent the possibility that the fluid being measured could form deposits which would interfere with the accuracy of detection by the arrangement.

A concomitant object of the present invention is to devise a pressure-detecting arrangement of the isolation type which is relatively simple in construction, inexpensive to manufacture, easy to install and use, and reliable in operation nevertheless.

In pursuance of these objects and others which will become apparent hereafter, one feature of the present invention resides in an arrangement for detecting the pressure of a fluid, this arrangement comprising a housing having an internal surface which bounds an elongated bore centered on a longitudinal axis, a recess extending substantially radially with respect to the longitudinal axis outwardly beyond the bore over only a part of the elongation of the latter, and a port communicating with the recess and leading to the exterior of the housing; a sleeve-shaped element having two end portions and a flexible intermediate portion therebetween bounding an internal passage for the fluid and impervious thereto, and so received in the bore that the end portions are located at opposite axial sides of the recess, and the intermediate portion spans the recess, and as to be in sealing contact with the internal surface to seal the recess from the passage; a pressure gauge having a closing portion that sealingly closes the port, and a pressure-detecting mechanism that is in communication through the closing portion with the recess; and a quantity of pressure-transmitting fluid filling the recess and the pressure gauge to transmit to the pressure-detecting mechanism the pressure of the fluid present in the passage as applied to the pressure-transmitting fluid through the flexible intermediate portion of the sleeve-shaped element with attendant flexing thereof.

A particular advantage of the arrangement as described so far is that, since the end portions of the sleeve-shaped element are axially spaced from the area of the recess and thus from the region at which the measurement is performed, the danger that the fluid being measured or any deposits precipitating therefrom could interfere with the proper operation or movement of the flexible portion is eliminated or at least kept to a minimum. Furthermore, since the transition from the sleeve-shaped element to a tubular portion, such as a pipeline section, is arranged remotely from the measurement or detection region, that is, at a region where the flexing of the flexible portion has a negligible effect, if any, the danger of penetration of the fluid being measured into any gap or interface is minimized or eliminated. Last but not least, even if such penetration and attendant deposition of particles carried by the fluid being measured occurred, it would not affect the operation of the flexible portion and thus the accuracy of the measurement.

It is particularly advantageous when the recess extends circumferentially around the entire periphery of the bore. In this instance, the accuracy of measurement is improved, since local encrustations on the flexible portion would not interfere with the accuracy of measurement. It is further advantageous when the sleeve-shaped element extends over the entire length of the bore, since then the proper positioning and sealing of the sleeve-shaped element in the bore of the housing are particularly easy to accomplish.

According to an advantageous aspect of the present invention, the internal surface of the housing further bounds respective retaining recesses juxtaposed with predetermined regions of the respective end portions of the sleeve-shaped element, and the sleeve-shaped element has, at the aforementioned regions thereof, outwardly extending projections which are received in the retaining recesses of the housing. Each of such retaining recesses is advantageously configured as a circumferentially complete groove, and each of the projections is configured as a circumferentially complete ridge. This is particularly advantageous when the sleeve-shaped element extends over the entire length of the bore, and when the retaining recesses and projections are arranged at the axial ends of the bore.

According to a currently preferred concept of the present invention, the internal surface of the housing includes two sections which axially delimit the recess, and the sleeve-shaped element has two external arms which extend outwardly of the sleeve-shaped element at axially opposite sides of the flexible portion and are in sealing contact with the internal surface sections. A particular advantage of this construction is that the arms of the sleeve-shaped element prevent the pressure-transmitting fluid from leaking past the sleeve-shaped element toward an area where it could mix with the fluid being measured, and vice versa.

This concept is particularly advantageous when the housing has a central part and two end parts separate from the central part and connected thereto in a disassemblable manner, and when the external arms are confined between the central part and the respective one of the end parts. This construction not only improves the sealing effect, but also simplifies the introduction of the sleeve-shaped element into the housing.

The internal surface of the housing includes a bottom section which interconnects the two internal surface sections to delimit the recess therewith, the aforementioned port opening onto such bottom section.

The arrangement of the present invention is particularly useful in conjunction with a tubular section that supplies the fluid to be measured to the arrangement, the housing having an end face which faces the tubular section in use, at least one of the end portions of the sleeve-shaped element extends all the way to and beyond the end face and has an outwardly projecting collar which is juxtaposed with the end face of the housing and confined between the same and the tubular section in use to act as a seal. In this context, it is advantageous when the passage has an outline corresponding to the internal outline of the tubular section to provide a smooth transition for the fluid between the tubular section and the sleeve-shaped element.

It is even more advantageous when the arrangement of the present invention is incorporated in a pipeline that conveys the fluid to be measured, between two sections of such a pipeline, in which case the housing has two end faces each of which faces one of the pipeline sections in use, and each of the end portions of the sleeve-shaped element extends all the way to and beyond the end face and has an outwardly projecting collar which is juxtaposed with the respective one of the end faces of the housing and is confined between the same and the respective pipeline section in use to act as a seal thereat. Even here, it is advantageous when the passage has an outline which substantially corresponds to the internal outline of the pipeline sections to provide a smooth transition for the fluid between the sleeve-shaped element and the pipeline sections. Finally, it is advantageous when the housing has a groove at each of the end faces thereof, and when each of the outwardly projecting collars has a rib received in the respective groove in use.

The novel features which are considered as characteristic of the invention are set forth in particular in the appended claims. The improved pressure detecting arrangement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an end view of a detecting arrangement of the present invention as incorporated in a pipeline, prior to the mounting of a gauge thereon;

FIG 2 is a longitudinal sectional view of the arrangement of the present invention, taken along the line 2—2 of FIG. 1, but after the gauge has been mounted; and FIG. 3 is a cross-sectional view taken on line 3—3 of FIG. 2, with only a closing portion of the gauge being shown therein.

DETAILED DESCRIPTION OF THE PREFERRED EMBODIMENT

Referring now to the drawing in detail, and first to FIG. 1 thereof, it may be seen that the reference numeral 1 has been used therein to identify a pressure detecting arrangement of the present invention in its entirety. The arrangement 1 includes, as one of its main components, a housing 2 which is connected, in any conventional manner which has not been shown in the drawing in order not to unduly encumber the same, to a flange 3 of a pipe section 4. The pipe section 4 may be a part of a receptacle containing the fluid the pressure of which is to be detected or measured or, as shown in FIG. 2 in more detail, a part of a pipeline that includes another pipe section 5 having its own flange 6. In this case, at least, the housing 2 is connected to the flanges 3 and 6 by means of its own flanges 7 and 8, respectively. The connections may be accomplished by means of well-known annular or partly annular clamping arrangements which engage the flanges 3 and 7, on the one hand, and the flanges 6 and 8, on the other hand, from the outside and urge the same toward one another, in a manner which is too well known to those skilled in this field to require any additional description or illustration.

The housing 2 is shown in FIG. 2 to be constituted by a central or intermediate section or element 9, and by two end sections or elements 10 and 11 which are separate from one another and from the central element 9, but are connected to the central element 9 by means of respective threaded connections 12 and 13 constituted by respective meshing external and internal threads. The end element 11 carries the flange 7, while the other flange 8 of the housing 2 is provided on the other end element 10. The central element 9 includes a measuring port 14, as well as a relief port 15. In the position shown in the drawing, which is the preferred position of use of the arrangement 1, the measuring port 14 is situated at the top and the relief port 15 at the bottom of the arrangement 1; yet, deviations from this orientation are acceptable, so long as they do not deleteriously affect the operation of the arrangement 1 or its accuracy.

The elements 9, 10 and 11 which together constitute the housing 2 bound an internal bore 16, and a recess 17 which extends outwardly beyond the bore 16 and at least substantially radially with respect to the longitudinal axis of the bore 16. As shown particularly in FIG. 3, the recess 17 is circumferentially complete, that is, it extends all the way around the bore 16. The central element 9 of the housing 2 has an internal or bottom surface section 18 which delimits the recess 17 from radially outwardly, and the end elements 10 and 11 have respective end or axial delimiting surfaces 19 and 20 which delimit the recess 17 in the axial directions.

A sleeve-shaped element 21 of elastomeric or flexible material is accommodated in the interior of the housing 2, at least predominantly if not in its entirety. The sleeve-shaped element 21 includes two end portions 22 and 23 which are situated at the respective axial sides of the recess 17, and an intermediate portion 24 which is integral with the end portions 22 and 23 and spans the recess 17. The intermediate portion 24 is shown to be somewhat thicker than the end portions 22 and 23 to make it more resistant to rupture in view of the missing backing therefor at the region of the recess 17, but this need not be necessarily so; rather, the end portions 22 and 23 and the intermediate portion 24 could all be of the same thickness.

The sleeve-shaped element 21 is further provided with radially outwardly extending arms or collars 25 and 26 which are situated at the regions at which the intermediate portion 24 merges with the respective end portions 22 and 23 and which are confined, at their outer peripheries, between the respective end elements 11 and 10 and the intermediate element 9 of the housing 2. Preferably, the confinement is of such a character that a substantially hermetic sealing action is obtained at the confined zones of the arms 25 and 26 all around the periphery of the recess 17 at the respective axial ends of the latter. The flexible intermediate portion 24 of the sleeve-shaped element 21 does not completely fill the recess 17; rather, it leaves a space 27 between itself and the internal surface 18 of the central housing element 9, this space 27 being axially delimited by the respective arms 25 and 26. The space 27 accommodates a body of liquid 28 which completely, or substantially so, fills the space 27. Obviously, the sealing contact of the arms 25 and 26 with the housing 2 prevents the liquid 28 from escaping from the space 27 into the interfaces between the end portions 22 and 23 and the internal surfaces of the end elements 11 and 10 of the housing 2.

The sleeve-shaped element 21 bounds an internal passage 29 which accommodates the fluid, especially liquid, the pressure of which is to be measured. As illustrated, the surface bounding the passage 29 has the same diameter as the inner surfaces of the pipe sections 4 and 5, so that a smooth, stepless transition is obtained at the interfaces between the sleeve-shaped element end portions 22 and 23 and the respective pipe sections 4 and 5. This assures not only that there are no changes in flow-through cross-section for the flow of the fluid to be measured or obstructions extending into the path of such flow, which could interfere with the flow or cause turbulences therein, but also that there are no dead corners in which the fluid to be measured could come to a standstill or flow at a much reduced speed, thus increasing the possibility of deposition or sedimentation of solid particles or encrustations from the fluid to be measured. Of course, the same objective can also be achieved if the end portions 22 and 23 of the sleeve-shaped element did not extend all the way to the ends of the bore 16, in which case the internal surface bounding the bore 16 in each of the end elements 11 and 10 would be stepped from a smaller diameter corresponding to that of, and steplessly merging with, the respective inner passage of the respective pipe section 4 and 5, to a larger diameter coextensively with the end portions 22 and 23 of the sleeve-shaped element 21. In this case, a groove could be provided at the larger-diameter side of and next to the step, for accommodating an outer peripheral ridge of the respective end portion 22 or 23, to achieve a sealing effect at this region and thus to prevent the fluid present in the passage 29 to penetrate into the interface between the respective end portion 22 or 23 and the surface bounding the bore 16. In the illustrated embodiment, however, the end portions 22 and 23 of the sleeve-shaped element 21 extend not only to the respective ends of the bore 16, but also slightly beyond the same. Then, the so projecting zones of the end portions 22 and 23 are provided with respective outwardly projecting sealing collars 30 and 31 which are confined between the respective end faces of the housing end portions or elements 11 and 10, and the facing end faces of the respective pipe sections 4 and 5. These end faces are shown to be provided with respective grooves 32, 33, 34 and 35 which receive respective bulges 36, 37, 38 and 39 of the respective sealing collars 30 and 31. The sealing collars 30 and 31 seal the interfaces between the housing 2 and the respective pipe sections 4 and 5.

A plug 40 is received in the relief port 15 in a sealing but removable manner. As illustrated, the plug 40 has an external thread, while the surface bounding the relief port 15 is provided with an internal thread that meshes with the external thread of the plug 40. When the plug 40 is removed from the port, the pressure-transmitting fluid 28 can be drained from the space 27. On the other hand, the measuring port 14, which is also shown to be provided with an internal thread, receives, in a sealing manner, an externally threaded mounting or closing portion 41 of a pressure gauge 42 which is of a conventional construction and has a known internally arranged pressure-sensing or pressure detecting mechanism, to which the pressure prevailing in the space 27 is applied through a duct provided in the mounting portion 41 by the pressure-transmitting liquid 28. The pressure-detecting mechanism will then give an indication of this pressure. As illustrated, such indication is provided by a pressure dial 43, and a pressure indicator 44 which is connected to the output of the pressure-detecting mechanism for movement therewith.

The end elements 11 and 10, and possibly also the intermediate element 9, of the housing 2, are provided with respective engagement surfaces that are to be used for engagement during the assembly and/or disassembly of the housing 2. As shown, such engagement surfaces, identified by reference numerals 45 and 46, may extend parallel to one another at opposite sides of the end element 11 or 12, so that they can be engaged by a monkey wrench or a similar tool.

Having so described the construction of the arrangement of the present invention, its operation will now be briefly discussed, and the advantage thereof over the prior art will be pointed out.

After the arrangement 1 is incorporated into the pipeline, between the sections 4 and 5 thereof, with the sealing collars 30 and 31 confined between the respective end faces and pressed into sealing contact therewith by the action of the clamping arrangements or the like which engage the respective flanges 3 and 7, and 6 and 8, respectively, fluid whose pressure is to be detected or measured is admitted into the interior of the pipeline and hence into the passage 29. The space 27 is filled with the pressure-transmitting liquid 28, either prior to such incorporation or thereafter, to fill not only the space 27 but also the interior of the gauge 42. Advantageously, this is accomplished prior to the incorporation, by pouring the pressure-transmitting liquid 28 into the space 27 through the relief port 15, with the mounting portion 41 of the gauge 42 closing the port 14, and with the port 15 facing upwardly. Once the plug 40 is threaded into the port 15 following the filling of the space 27 and the gauge 42 with the liquid 28, the introduced quantity of the liquid 28 is confined in the space 27 and in the gauge 42, without possibility of escaping therefrom, due to the sealing action of the mounting portion 41, the plug 40, and the confined portions of the arms 25 and 26 of the sleeve-shaped element. On the other hand, once the arrangement 1 is incorporated between the pipe sections 4 and 5, the sealing action of the sealing collars 30 and 31 prevents the fluid to be measured from escaping from the passage 29 and thus from the pipeline. Thus, the sealing element effectively and efficiently separates the two fluids.

The pressure of the fluid present in the passage 29 acts radially outwardly on the sleeve-shaped element 21. As far as the end portions 22 and 23 are concerned, this merely means that these end portions will be more firmly pressed against the surface bounding the bore 16. However, at the region of the intermediate flexible portion 24 of the sleeve-shaped element 21, this pressure will cause the flexible portion 24 to deflect outwardly. This means that the pressure in the space 27 will increase, and the pressure-transmitting liquid 28 will transmit such pressure increase to the pressure-measuring mechanism of the gauge 42, thus changing the indication thereof as provided by the pressure indicator 44 against the background of the pressure dial 43. Similarly, when the pressure of the fluid present in the passage 29 goes down from the previously reached level, this pressure reduction will cause reduction in the extent of flexing of the flexible portion 24 of the sleeve-shaped element 21, thus reducing the pressure in the space 27, that is, the pressure of the pressure-transmitting liquid, and thus ultimately the read-out of the gauge 42.

Since the flexible portion 24 is adjoined by integral end portions 22 and 23 which extend to regions of the bore 16 that are remote from the recess 17, no penetration of the fluid present in the passage 29 between the surfaces 19 and 20 and the arms 26 and 25, respectively, where such penetrating fluid could otherwise interfere with the operation of the flexible portion 24 and thus with the accuracy of the measurement. On the other hand, since the regions of the end portions 22 and 23 of the sleeve-shaped element 21 at which penetration could take place are remote from the flexible portion 24, so that the deformation attending the flexing of the flexible portion 24 has no influence on shape of the end portions 22 and 23 at these regions, such penetration is unlikely even at these regions. However, even if some of the fluid penetrated from the passage 29 into such regions, and formed deposits of encrustations therein, this would not cause any deleterious effects since whatever happens at these regions has no bearing on the performance of the detecting function by the arrangement 1, particularly on the flexing of the flexible portion 24.

It will be understood that, if pressure inside a container, rather than in a pipeline, were to be measured, the same arrangement 1 could also be used. In this case, one of the end portions 11 and 10 would be connected to a tubular portion or nipple of such container, and the other end portion 10 or 11 would be hermetically closed, for instance, by a disc-shaped closure spanning the passage 29 at the respective sealing collar 31 or 30 in sealing contact with the latter.

The arrangement 1 according to the present invention is especially suited for use in environments where the fluid, particularly but not exclusively liquid, whose pressure is to be measured, is a food or pharmaceutical product, and would clog the gauge 42 if not effectively separated therefrom, or is to be conveyed in a sanitary manner. However, the arrangement 1 can also be used in applications different from those specifically mentioned here.

It will become apparent that, since the recess 17 extends all the way around the bore 16, the flexible portion 24 will expand in all directions substantially uniformly when uniform pressure acts thereon in all radial directions. However, even if this were not the case, that is, if the radial pressure differed from one location to another along or around the flexible portion 24, or if some zones of the flexible portion 24 were less flexible than others, the accuracy of the measurement would not suffer since other portions of the flexible portion 24 would make up for the deficiencies or imperfections of the affected regions.

It will be understood that each of the elements described above, or two or more together, may also find a useful application in other types of arrangements differing from the type described above.

While the invention has been illustrated and described as embodied in an isolation fluid pressure detector, it is not intended to be limited to the details shown, since various modifications and structural changes may be made without departing in any way from the spirit of the present invention.

Thus, the pressure detector of this invention can be used to detect the pressure of any fluid and, as used herein, the term "fluid" is intended to include slurries and sludges and, particularly, those in which solids from the food or pharmaceutical industry are entrained. In these industries, sanitary conditions are imperative, and the food or pharmaceutical products must be isolated from the gauge and particularly from the captive pressure-transmitting liquid 28 therein, which liquid is typically mineral oil. Food or pharmaceutical products such as tomato skins, seeds, corn, beans, pharmaceutical powder, drugs, etc. which would otherwise normally clog the gauge are dislodged due to the flexing action of the flexible element in a self-cleaning action. Since the flexible element preferably extends the full length of the housing, this construction eliminates any pockets for food or pharmaceutical products to lodge in. Any decayed products in such pockets can be a source of contamination. There are no internal pockets, or dead-ends, or crevices; hence, this results in a full, uninterrupted, sanitary flow.

Advantageously, as noted above, the detector of this invention provides for a full 360° circumferential pressure reading, and can be mounted in any flow direction. Any trapped air in the pipeline, or local sediment deposits, will not change the gauge reading. The relief port 15 also serves as an instrument connection in the event that other equipment or tubing is intended to be connected to the detector.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. An arrangement for detecting the pressure of a fluid, comprising:
   (A) a housing having a central part and two end parts separate from said central part and connected thereto in a disassembleable manner, said parts having
      (i) an internal surface which bounds an elongated bore centered on a longitudinal axis,
      (ii) a recess extending substantially radially with respect to said longitudinal axis outwardly beyond said bore over only a part of the elongation of the latter and extending circumferentially around the entire periphery of said bore, and
      (iii) a port communicating with said recess and leading to the exterior of said housing;
   (B) a sleeve-shaped element extending over the entire length of said bore and having
      (i) two end portions at opposite axial end regions of said bore,
      (ii) a flexible intermediate portion between said end portions, and
      (iii) two outwardly-extending arm portions at axially opposite sides of said flexible portion between said end portions,
      said sleeve-shaped element
      (iv) bounding an internal passage for the fluid and impervious thereto, and
      (v) so received in said bore that said arm portions are located at opposite axial sides of, and said intermediate portion spans, said recess,
         (a) said arm portions being confined between, and sealingly contacting, said central part and a respective one of said end parts,
         (b) said arm portions having axially-extending lips extending toward each other and into retaining recesses in said central part so as to seal said recess from said passage;
   (C) a pressure gauge having a closing portion that sealingly closes said port, and a pressure-detecting mechanism that is in communication through said closing portion with said recess; and
   (D) a quantity of pressure-transmitting fluid filling said recess and said pressure gauge to transmit to said pressure-detecting mechanism the pressure of the fluid present in said passage as applied to said pressure-transmitted fluid through said flexible intermediate portion of said sleeve-shaped element with attendant flexing thereof.

2. The arrangement as defined in claim 1 for use with a tubular section that supplies the fluid, wherein said housing has an end face which faces the tubular section in use; and wherein at least one of said end portions of said sleeve-shaped element extends all the way to and beyond said end face and has an outwardly projecting collar which is juxtaposed with said end face of said housing and confined between the same and the tubular section in use to act as a seal.

3. The arrangement as defined in claim 2, wherein said passage has an outline substantially corresponding to the internal outline of the tubular section to provide a smooth transition for the fluid between the tubular section and said sleeve-shaped element.

4. The arrangement as defined in claim 1 for incorporation between two sections of a pipeline that conveys the fluid, wherein said housing has two end faces each of which faces one of the pipeline sections in use; and wherein each of said end portions of said sleeve-shaped element extends all the way to and beyond said end face and has an outwardly projecting collar which is juxtaposed with the respective one of said end faces of said housing and is confined between the same and the respective pipeline section in use to act as a seal thereat.

5. The arrangement as defined in claim 4, wherein said passage has an outline substantially corresponding to the internal outline of said pipeline sections to provide smooth transition for the fluid between said sleeve-shaped element and the pipeline sections.

6. The arrangement as defined in claim 4, wherein said housing has a groove at each of said end faces thereof; and wherein each of said outwardly projecting collars has a rib received in the respective groove in use.

7. The arrangement as defined in claim 1, wherein said flexible portion has a radial thickness which is greater than that of the end portions for greater rupture resistance.

* * * * *